Patented Nov. 20, 1945

2,389,575

UNITED STATES PATENT OFFICE 2,389,575

IMMOBILE N-SUBSTITUTED NAPHTHYLAMINE DYE INTERMEDIATES

James Emory Kirby and David W. Woodward, Wilmington, Del., assignors to E. I. du Pont de Nemours & Company, Wilmington, Del., a corporation of Delaware No Drawing. Application July 8, 1942, Serial No. 450,146

11 Claims. (Cl. 95—6)

This invention relates to a new class of basic N-substituted naphthylamine dye intermediates of high molecular weight and to their preparation and use. The invention further relates to processes of color photography and to photographic compositions and articles of manufacture utilizing such dye intermediates.

This invention has for an object the production of new dye intermediates of high molecular weight. A further object is to provide new dye intermediates which are immobile or non-diffusible in water-permeable colloid binding agents. A related object is to provide basic N-substituted naphthylamine dye intermediates which form azo dyes coupling. A still further object is to provide N-substituted naphthylamine dye intermediates which will couple with the oxidation products of color-coupling developing agents during the reduction of silver salt images. Another object is to provide immobile basic naphthylamine dye intermediates which are capable of forming (a) an azo dye and (b) an indamine dye. Still further objects are to provide methods of preparing such intermediates. Still other objects will appear hereinafter.

The above objects are attained by the following invention which involves the preparation and use of N-substituted naphthylamine dye intermediates connected through the nitrogen atom by means of a bivalent hydrocarbon or ether-interrupted bivalent hydrocarbon radical of at least two carbon atoms to the nitrogen atom of an acid amide.

In a more limited sense the invention involves the preparation and use of such intermediates which have a molecular weight of at least 300. The components of the structure just described may be varied to obtain such a molecular weight in various ways. When the bivalent hydrocarbon or ether-interrupted hydrocarbon radical is of high molecular weight the acyl radical may be of low molecular weight, and vice versa. If both of such radicals are of relatively low molecular weight the naphthalene nucleus can be substituted with groups, for example, hydrocarbon radicals which will increase the molecular weight to the desired extent.

An important aspect of the invention is concerned with photographic color-yielding elements having one or more water-permeable colloid layers at least one of which has incorporated therein one of the novel dye intermediates hereof. The colloid layers in general are carried by a base or support of sufficient mechanical strength for handling in photographic processing baths.

In making the photographic color-yielding elements, the immobile or non-diffusing dye intermediates of this invention may be dissolved in aqueous alkali or aqueous alcoholic alkali solution and then mixed with a water dispersion or solution of a water-permeable or reversible colloid such as gelatin, agar-agar, gum arabic, albumin, Irish moss, gelatin substitutes or other synthetic or natural polymeric materials useful in colloid layers of photographic elements and coated into layers. They may, for example, be deposited on a film base or support having a substratum of the type suitable for anchoring silver halide layers. The coating procedures and equipment used for silver halide emulsion layers are satisfactory. The gelatin-dye intermediate dispersions may be coated directly on a light sensitive silver halide layer or stratum or on a water-permeable layer or stratum coated on such a layer or stratum. The dye intermediates may be admixed with gelatin-silver halide emulsions if desired and coated to form single or multilayer photographic elements. In this aspect the dye intermediates are more intimately associated with the silver halide grains.

A preferred aspect of the invention is concerned with the preparation and use of N-substtiuted aminonaphthalene dye intermediates of the formula:

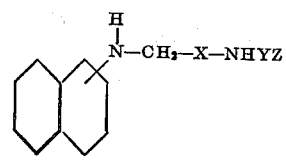

wherein X is a divalent hydrocarbon radical or a divalent radical which is a hydrocarbon radical interrupted by ether oxygen, Y is a member of the group consisting of —CO— and —SO$_2$—, and YZ is the acid-hydroxyl-free portion of an organic acid taken from the group consisting of organic carboxylic acids and sulfonic acids including a unit of a polymeric acid.

The substituted amine group may be located either in the alpha or beta position in the naphthalene nucleus. The dyes produced from these isomers differ in structure depending upon the coupling conditions. The alpha derivatives form indamine dyes when used in photographic color development processes utilizing color coupling developing agents such as primary aromatic amino developing agents. Thus when p-aminodiethylaniline is used in developing or reducing a silver salt image in the presence of an alpha derivative a dye is produced having the structure:

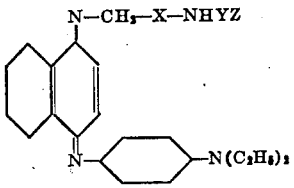

In processes of color photography and dye formation procedures wherein azo dyes are produced either by coupling with diazonium compounds or color developing with primary aromatic hydrazine developing agents, either the alpha or beta isomers may be used. When the intermediates are used in processes involving color-coupling development and azo coupling steps, such as that of Woodward, Serial No. 335,416, now United States Patent No. 2,297,732, it is preferable that an alpha derivative be used. Azo dyes produced from these derivatives range in shade from red through magenta to blue and will have one of the following structures:

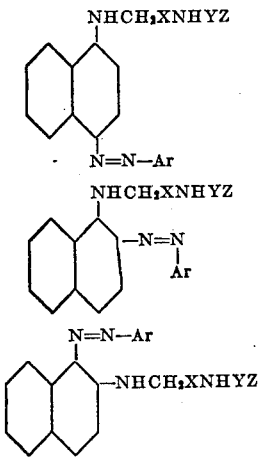

Other substituents as are well known in dye chemistry art may also be present in the naphthylamine nucleus.

The hydrogen atoms in the above formulae may be replaced by lower alkyl groups, e. g., of one to four carbon atoms without radically changing the properties of the product except that in the case where the compound is to be coupled with the oxidation product of photographic developers, the amino-nitrogen atom attached to the naphthalene nucleus must contain one hydrogen atom.

The primary function of the acyl radical which has been represented by YZ in the above formulae, is to confer non-diffusing properties in colloid layers to the dye intermediate. It is therefore preferable that it be of appropriate molecular size to cause the final product to form a colloidal suspension or solution in water so that, when added to a photographic binding agent such as gelatin, the dye intermediate is not leached out by aqueous processing solutions. The acyl radical in general should have a molecular weight greater than 150 and the molecular weight of the entire dye intermediate is preferably greater than 300.

The preferred dye intermediates contain free carboxylic or sulfonic acid groups either on the naphthalene nucleus or on the acid radical Z. These groups contribute aqueous dispersibility. That is, they permit the preparation of aqueous dispersions or colloidal solutions which are compatible with gelatin and as a result give completely haze-free films which are convertible to clear, bright colors. Such products give clear, colloidal dispersions or solutions to the extent of at least 0.5 gram in 100 grams of 2% sodium carbonate solution. Such preferred dye intermediates having a secondary amino group are especially useful in process of Serial No. 335,416, now United States Patent No. 2,297,732.

The products of this invention may be prepared, among other ways, by condensing either (a) an N-substituted naphthylamine containing an amino group on the N substituent with an amidating agent such as acids or derivatives thereof including acid esters, acid halides, e. g., chlorides and anhydrides, or (b) by the reaction of a naphthylamine with a substituted alkyl halide containing an acylamide group or groups easily converted to an acylamide group. Illustrative of methods for preparing these products are the following:

(1) A naphthylamine is condensed in an anhydrous solvent with a substituted alkyl halide containing an amide group, for example, beta-acetylaminoethyl bromide or p-acetylaminophenoxyethyl bromide. If it is desired to obtain a final product having a different radical on the amide nitrogen, the material may be hydrolyzed in boiling dilute mineral acid to remove the acetyl group and the amino group then acylated with an acylating agent such as an acid or derivative thereof, e. g., the ethyl or methyl ester, acyl halide, e. g., chloride, bromide or iodide, acid anhydride, sulfonyl chloride or bromide, etc. Representative high molecular weight acylating agents include abietic, naphthenic, stearolic, naphthoic or stearic acids or polymers such as an olefin-maleic anhydride, polymethacrylic acid, sulfonyl chlorides such as benzenesulfonyl chloride, dodecanesulfonyl chloride, p-dodecylbenzenesulfonyl chloride, and polymeric sulfonyl chlorides as described in U. S. 2,212,786.

(2) In place of the acetylaminoalkyl halide in paragraph 1 above, it is possible to use a nitroalkyl halide, e. g., p-nitrobenzyl chloride, or p-nitrophenoxyethyl bromide. The product obtained, which contains a nitro group, can be converted to an amino compound by reduction and the amino group can be acylated. For instance, nitro groups can be reduced with zinc and hydrochloric acid, iron, or any other suitable method, and the resulting amine converted to an amide with a suitable organic acid or derivative thereof as described under the preceding paragraph.

(3) Another method consists in condensing a nitroaldehyde such as meta-nitrobenzaldehyde with a naphthylamine to form a Schiff's base. The nitro group thereof as well as the unsaturated bond can be reduced either chemically or catalytically to form an N-aminobenzylnaphthylamine, then the amino group thus formed can be converted to an amide after the manner set forth in procedure 1.

(4) A naphthylamine or a naphthol can be condensed with an aliphatic diamine to form an N-aminoalkylamino-naphthalene. For instance, ethylenediamine in an aqueous sodium bisulfite solution condenses with beta-napthol to form N-aminoethyl-beta-naphthylamine. The external amino group may then be converted to an amide as in procedure 1.

(5) A naphthylamine may be condensed with an excess of an alkylene dihalide, for example, ethylene dibromide, and the resulting N-(bromoalkyl) naphthylamine treated with liquid ammonia to form the corresponding amino compound which can be acylated as in procedure 1.

The invention will be further illustrated by the following examples in which all parts are by weight, but it is not intended to be limited thereby.

*Example I(a).*—In a closed reaction vessel, equipped with a return condenser, and external heating unit, is placed 144 parts of 1-naphthylamine and 1000 parts of anhydrous dioxan. The air is removed by a stream of dry oxygen-free nitrogen and the mixture slowly heated. When solution is complete and the mixture is boiling gently, 140 parts of p-(beta-bromoethoxy) acetanilide is introduced and boiling continued for 18–20 hours, at which time 75 gm. of diethylaniline and 70 parts of p-(beta-bromoethoxy) acetanilide is added. After boiling an additional 12 hours the second addition is repeated and boiling continued for a further 20 hours. At the end of this time the mixture is poured with agitation into 4000 parts of ice water containing 90 parts of sodium hydroxide. After standing to allow the mixture to settle the supernatant liquor is decanted and the precipitate twice again stirred with water and decanted. The water insoluble residue is dissolved in 500 parts of ethyl alcohol, 20 parts of activated charcoal added, mixture filtered and diluted with 100 parts of benzene. The mixture is then boiled down to 250 parts and cooled to allow crystallization. Light colored crystals separate in 60% yield. The product has the following probable structure:

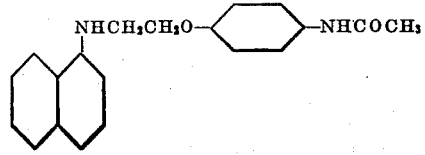

This dye intermediate when suspended in water containing 3% acetic acid and 5% sodium acetate and treated with an aqueous solution containing equimolar amounts of 2-chloro-4-nitrobenzene diazonium chloride at 10° C. forms a bright magenta azo dye having a spectral transmission minimum at 500–540 millimicrons and a spectral transmission maxima at 420 millimicrons and above 650 millimicrons.

(b) To 600 parts of boiling water containing 40 parts of concentrated hydrochloric acid of specific gravity 1.19 in an open reaction vessel is added 34 parts of the dye intermediate of part *a* above. Boiling and agitation are continued for 8 hours, water being added to maintain the original volume. Then 1 part of sodium sulfite and 5 parts of activated charcoal are added and the mixture filtered. To this filtrate is added 50 parts of concentrated hydrochloric acid, 100 parts of sodium chloride, and the mixture cooled to 0° C. The solid hydrochloric acid salt which separates is removed, dissolved in 200 parts of boiling water and the solution neutralized with 25 parts of sodium acetate. The mixture upon cooling to room temperature and filtration yields a light tan colored product, corresponding in structure to the above product but having the —COCH₃ group replaced by hydrogen. When recrystallized from 95% alcohol a yield of better than 80% is obtained.

In a closed reaction vessel, equipped with a heater, return condenser, and slow flow of purified nitrogen gas, is placed 150 parts of the dye intermediate of part *b* above and 600 parts of dry acetone. The mixture is heated and when the solution is boiling gently 63 parts of an ethylene/maleic anhydride interpolymer and 400 parts of acetone are added through the condenser. After the mixture has boiled for 6 hours it is poured into 5000 parts of benzene with agitation, filtered, and extracted with benzene in a continuous extractor for 12 hours. The material after drying and grinding yields 150 parts of a light-gray powder readily soluble to the extent of at least 10% in 5% sodium carbonate solution. This compound has the following probable dye intermediate unit structure:

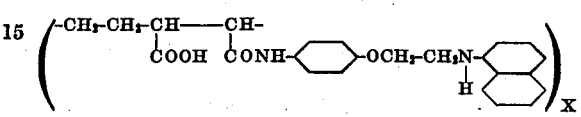

When 10 parts of this compound is dissolved in 100 parts of 4% aqueous sodium carbonate solution and mixed with 900 parts of a gelatin silver chloride-bromide photographic emulsion containing 10–12% solids and coated on a suitable subbed support a film is obtained from which the intermediate is not removed by prolonged washing in alkaline or acidic aqueous processing solutions. A sample of this film can be exposed by controlled light, developed in a 4-aminodiethylaniline developer, bleached in a 4% potassium ferricyanide bleach bath and fixed by the customary procedure to yield magenta indamine dye image. Other samples of the same film can be treated with aqueous diazonium solutions of pH 1–7 with fixing prior or subsequent to such treatment, to yield clear, brilliant azo dyes. A partial list of the colors which may be formed is contained in the following table:

| Diazotized amines | Color |
|---|---|
| Aniline | Red. |
| 2,4-dichloroaniline | Bluish red. |
| Dianisidine | Magenta. |
| 2-chloro-4-nitroaniline | Do. |
| 4-nitroaniline-2-sulfonic acid | Do. |
| 2,4-dinitroaniline | Purple. |

*Example II.*—In a closed reaction vessel with heating means and return condenser are placed 245 parts of the sodium salt of 1-aminonaphthalene-6-sulfonic acid and 900 parts of water. The mixture is heated until solution is complete, then 130 parts of sodium acetate and 900 parts of dioxan are added with stirring. The mixture is then heated to its boiling point. To this solution is added 130 parts of p-nitrophenoxyethyl bromide and boiling continued for 12 hours. During this time and subsequent boiling, 20% sodium hydroxide solution is added in small portions to keep the mixture neutral to litmus paper. Next an addition of 40 grams of the above nitro compound is made and boiling continued for 12 hours. This procedure is repeated until a total of 250 grams of the nitro compound has been added. The mixture after a final 12 hour boiling is poured with agitation into 300 parts of ice water containing 200 parts of concentrated hydrochloric acid of specific gravity 1.19. The solid is removed by filtration and then washed by stirring in 3000 parts of boiling acetone filtered and dried. The product is next dissolved in 2000 parts of boiling water containing 50 parts of sodium hydroxide, filtered hot, the filtrate cooled and acidified with 150 parts of concentrated hydrochloric acid of specific gravity 1.19. The compound 1-(N-p-nitrophenoxyethylamino) naphthalene-6-sulfonic acid is removed by filtration and dried to give 195 parts of a light gray powder of the formula:

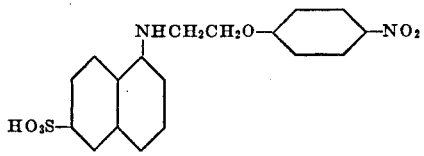

One hundred ninety-four parts of this nitro compound is dissolved in 2000 parts of water containing 20 grams of sodium hydroxide. Thirty parts of acetic acid is added followed by 100 parts of iron filings adding 5 parts every one-half hour. The mixture is stirred and boiled for an additional 4 hours, made alkaline with 65 parts of sodium carbonate, and filtered. The filtrate is cooled to room temperature and acidified to a full spot on Congo red paper with concentrated hydrochloric acid, filtered and dried to give 148 parts of the corresponding amino compound as a light gray powder.

In a reactor with 3 openings fitted with a sealed agitator, an L-shaped distillation column with a downward collecting condenser, and an addition cock is placed 2500 parts of dimethylformamide, 270 parts of the above amino compound, and 32 parts of sodium hydroxide dissolved in 32 parts of water. The mixture is agitated and heated until distillation occurs. Then a slow rate of distillation is maintained until the water has distilled and the temperature of the column head reaches 147–150° C., (the boiling point of the solvent). At this point 160 parts of a styrene/maleic anhydride interpolymer dissolved in 800 parts of dimethylformamide is added during the next one-half hour with agitation while distillation is maintained at a slow rate. After the addition is complete, distillation is continued until a total of 1400 parts of solvent has collected in the receiver, this is discarded. Heating is continued for a total of 6 hours, then the residue is cooled to room temperature and poured into 2500 parts of ice water and sufficient 20% sodium hydroxide added to make the solution just alkaline to brilliant yellow test paper. The solution is dialyzed for 4 days in a Cellophane membrane placed in running water. The resulting solution is filtered and evaporated to dryness under reduced pressure. In this way 250 grams of a light brown solid is obtained. The material has properties similar to those of the polymeric product of Example Ib and can be used similarly.

*Example III.*—To a boiling solution of 145 parts of 1-naphthylamine in 300 parts of absolute alcohol is added 150 parts of m-nitrobenzaldehyde and the solution cooled slowly with agitation to 0° C. The solid is removed and dried to give 255 parts of a bright yellow crystalline Schiff's base. A 31 part sample of Schiff's base is dissolved in 150 parts of dioxan and reduced in the presence of nickel catalyst with hydrogen at 200 lbs. pressure. The solution of 1-(m-aminobenzylamino)naphthalene is freed of catalyst by filtration, dried with anhydrous magnesium sulfate, and condensed with 15 parts of an ethylene/maleic anhydride polymer, in the same manner as in Example I, whereby 40 parts of a light gray polymeric product is obtained which can be incorporated in an emulsion after the manner of Example I. Films prepared in this way when treated with solutions of diazonium compounds as in Example I yield azo dyes of approximately the same shade.

*Example IV.*—An intimate mixture of 144 parts of alpha-naphthol, 240 parts of ethylenediamine, 100 parts of water, and 50 parts of sulfur dioxide is placed in an autoclave which is heated and rocked at 150° C. for 6 hours; the excess of ethylenediamine is then removed under reduced pressure and the residue extracted between ether and 5% sodium hydroxide solution. The ether extract is washed with water, evaporated, and distilled to give 115 parts of N-(beta-aminoethyl)-1-naphthylamine boiling at 180.5° C./4 mm. of mercury. This compound which has the following structure

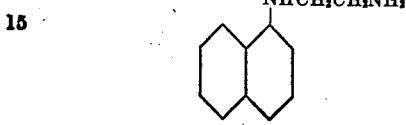

may be used to prepare non-diffusing dye intermediates in place of the monomeric amino compound of Example Ib with similar results.

*Example V.*—To a reaction vessel having three openings and equipped with an addition cock, a sealed agitator and a return condenser is added 223 parts of 2-naphthylamine-7-sulfonic acid, 800 parts of water, and 139 parts of ethylenediamine. The mixture is heated to its boiling point and stirred while 2500 parts of hot 40% sodium bisulfite solution is added during one-half hour. Stirring and boiling are continued for 5 hours (after about 1 hour crystals separate) then cooled and filtered. The solid is dissolved in 1000 parts of hot water containing 40 parts of sodium hydroxide, filtered, and poured slowly with agitation into 2000 parts of boiling water containing 200 parts of concentrated hydrochloric acid. On cooling, filtering and drying, white crystals are obtained in 95% yield. The compound has the following probable structure:

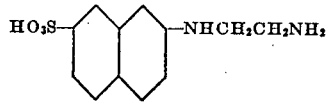

To a solution of 235 parts of this compound in 500 parts of water a solution of 220 parts of lauric acid chloride in 200 parts of dioxan is added during 2 hours at 10–50° C. The solution is maintained at a pH of about 7 by the addition of sodium carbonate until solution is complete. It is then warmed slowly to 60° C. while being stirred during 2 hours. The solution is then acidified with 100 parts of concentrated hydrochloric acid of specific gravity of 1.19 and the solid separated in a centrifuge, washed with water and separated again, dried, ground and then extracted in a continuous extractor with ether for 12 hours. The solid is then crystallized from water as the sodium salt and reprecipitated as the free acid to give 340 parts of white solid. This compound has uses similar to the product of Example II above in the production of azo dyes and has the following probable structure:

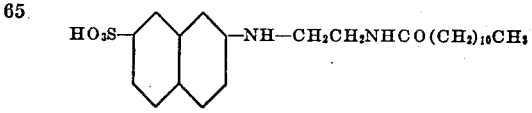

*Example VI.*—A solution of 25 parts of the 1-(N-p-aminophenoxyethylamino)-naphthalene-6-sulfonic acid of Example II and 4 parts of sodium hydroxide in 250 parts of water is stirred at 10–15° C. while 32 parts of octadecanesulfonyl chloride is added during 2 hours. During this time sodium carbonate is added to maintain a neutral solution. The mixture is cooled to 0° C. after stirring an additional 2 hours and filtered. The product is stirred in 200 parts of boiling water, separated by centrifuging, and is dried to give a light gray product readily soluble in warm 2% sodium carbonate. It has uses similar to those of the compound of Example II and gives similar colors.

The invention is, of course, not limited to the basic N-substituted naphthylamine dye intermediate of the above examples. On the contrary, it comprehends all such compounds which have the above described structure and constitution. All naphthylamines capable of forming azo or indamine dyes which possess the requisite N-substituent, i. e., all such compounds which have coupling positions ortho or para to the amino groups are included. Such positions may be occupied by hydrogen or replaceable groups which react like hydrogen in the coupling reaction such as —SO₃H, —COOH and halogen atoms, e. g., chlorine and bromine.

The preferred products of this invention, in addition to having the general characteristics and structure outlined above, also contain an acidic, salt-forming group such as sulfonic or carboxylic groups. These acid groups may be either in the naphthylamine nucleus or on the acyl residue of the acid amide group. These salt-forming groups permit the non-diffusible dye intermediates to be completely dispersed to the extent of at least 10% in aqueous solutions containing sodium carbonate of 0.1 to 10% concentration and preferably from 0.5 to 5% concentration.

Other groups which vary the shade, brilliance, light fasteners, or depth of the colors may be present in the dye intermediate nuclei. Such groups include halogen, alkoxy, acyl, amide, sulfonic, carboxylic and nitro groups.

With respect to the preferred aspects of the invention, it has been stated that the amino group of the naphthylamine nucleus and the amide nitrogen atom are connected by means of a hydrocarbon or ether interrupted hydrocarbon radical attached to the naphthylamine nitrogen through a methylene group. There are many types of organic bifunctional radicals that may be used in this connection and are essentially equivalent in this invention providing they are connected to the naphthylamine nitrogen through a methylene group or an alkyl substituted methylene group, in which either or both hydrogen atoms may have been replaced with small alkyl groups. The group connecting this methylene group with the amide nitrogen atom has some influence on the shade of the dye finally obtained and in seeking the correct shade for certain purposes one type of connecting link may have an advantage over another but in general all such products are useful in the field of this invention. A partial list of the types of groups that have been found to be desirable in connecting the methylene group with the amide nitrogen atom is as follows:

$$-CH_2(CH_2)_x-O-(CH_2)_x-CH_2-$$
$x=0$ to 20.

$$-CH_2(CH_2)_x-O\left(\underset{y}{\underset{}{\bigcirc}}\right)-(CH_2)_x-$$
$x=0$ to 20. $y=1$ to 3.

$$-(CH_2)_x\left(\underset{y}{\underset{}{\bigcirc}}\right)(CH_2)_x-$$
$x=0$ to 20. $y=1$ to 3.

$$-(CH_2)_x-\bigcirc-O(CH_2)_x-CH_2-$$
$x=0$ to 20.

$$-(CH_2)_x-\bigcirc\bigcirc-(CH_2)_x-$$
$x=0$ to 20.

$$-(CH_2)_x-HC\underset{CH_2-CH_2}{\overset{CH_2-CH_2}{\diagup\diagdown}}CH-(CH_2)_x-$$
$x=0$ to 20.

$$-(CH_2)_x-\bigcirc-SO_2-\bigcirc-$$
$x=0$ to 20.

$$-(CH_2)_x-\bigcirc-S-S-\bigcirc-(CH_2)_x-$$
$x=0$ to 20.

$$-(CH_2)_x-\bigcirc-O-\bigcirc-(CH_2)_x-$$
$x=0$ to 20.

In all of these groups any of the hydrogen atoms connected to carbon may, of course, be replaced by small alkyl groups, e. g., methyl, ethyl, et cetera.

The structure of the acid residue connected to the amide nitrogen atom has little effect on the shade of azo dye formed. Its primary function is to contribute sufficient molecular size to make the products non-migratory or non-diffusing in the binding agent of photographic layers. In general, it is preferred that the weight of this acid be at least 150 or that the total molecular weight of the final product be over 300. The following is a list of representative acids of various types which may be used in forming the amide group: (1) aliphatic, saturated or unsaturated, aromatic and heterocyclic monobasic acids, hydroxystearic, oleic, ricinoleic, stearolic, campholic, phenylacetic, cholic, picolinic, furoic, glycocholic, benzoic, opianic, naphthoic, abietic, naphthenic, straight chain saturated acids, e. g., $$CH_3(CH_2)_xCOOH$$

where $x$ equals 0 to 30, or (2) the residue of a polymeric acid, such as a polypeptide or polyamide of the type set forth in U. S. application Ser. No. 301,041, now United States Patent No. 2,330,291, polyacrylic, polymethacrylic acids, poly-olefin-maleic acids or (3) a unit of the polycarboxylic acid in which one or more carboxylic acid groups are similarly substituted such as maleic, camphoric, phthalic, naphthalic, $$HOOC-(CH_2)_x-COOH$$

where $x$ equals 2–20, melophanic, terebinic, tricarballylic, cyclobutandicarboxylic, or (4) a unit of a polysulfonic acid prepared from the polysulfonyl chlorides of U. S. Patent 2,212,786. The choice of the group to be used depends on the properties desired in the final product. If the amino substituted naphthylamine used in the preparation of their products contains a sulfonic or carboxylic acid group it is sufficient to condense it with a monocarboxylic acid acylating agent as one solubilizing group is already present. However, in cases where the naphthylamine nucleus contains no solubilizing groups, the condensation is preferable with an organic acid containing more than one acidic group so that one of these may be left free for purposes of solubilizing.

Compounds especially suitable for use in processes for the production of dye images involving color development of image areas and azo coupling in remaining areas, e. g., reverse image areas especially those of application Ser. No. 355,416, filed May 15, 1940, now United States Patent No. 2,297,732, include those containing in the naphthylamine nucleus a member selected from the group consisting of sulfonic, carboxyl, halogen, nitro, sulfonamide, sulfone, and cyano groups.

In place of the specific developing agent described in the above examples, can be substituted a large number of other color developing agents containing an unsubstituted amino group. Suitable additional agents are described in U. S. Patents 2,182,814, 2,189,817, 2,191,037, and 2,200,924. Other useful color coupling developing agents include those in U. S. Patent 2,163,820 and British Patent 541,649.

The silver salt images can also be developed with hydrazine developers in like manner to produce azo dye images. Suitable developers are described in U. S. Patents 2,220,929 and 2,196,734. Furthermore, silver halide emulsions containing one of the herein described dye intermediates which has been exposed and treated to develop the silver image and fixed, can be bleached and treated with a diazo or tetrazo, etc., salt and converted into a color image by the process of U. S. Patent 1,517,049.

Organic colloids other than gelatin can be used as binding agents with the novel dye intermediates hereof. Suitable additional colloids exhibiting high viscosity characteristics and appreciable gel strength include albumin, agar-agar, Irish moss, synthetic resins, e. g., polyvinyl acetals, et cetera.

The dye intermediates need not be placed directly in light sensitive layers but may be used in separate layers which are in contact or operative association therewith. Thus they can be incorporated in a separate gelatin or other water permeable colloid layer which is superimposed on light sensitive layers such as silver halide layers or spaced therefrom by means of thin water permeable colloid layers. They may also be used in colloid layers of elements such as those described in copending applications Murray, Serial No. 370,195 and Sease Murray, Serial No. 370,194, now United States Patent No. 2,328,034, for contact or imbibition development.

The compounds which contain as a constituent on the amide group a residue as hereinbefore described of sufficient size to render the product immobile in colloid layers of photographic film are of use in producing colored pictures by the methods described in U. S. Patents 1,055,155, 2,178,882, 2,179,228, 2,179,238, 2,179,239, and in the color development and azo coupling process of Woodward U. S. patent application Ser. No. 335,416, now United States Patent No. 2,297,732.

The preferred solubilized products of this invention have special advantages in these processes as being compatible with gelatin solution they are dispersed to form clear, transparent films which, on processing, yield bright, clear dye images. In contra-distinction the insoluble or pigment type of dye intermediate which must be dispersed or precipitated in the emulsion nearly always forms slightly hazy films which develop to duller colors.

The dye intermediates hereof may be used in conjunction with various types of reducible silver salts including those from simple and mixed silver halides, such as silver chloride, silver bromide, silver chlorobromide, etc., reversed images, latent images, bleached silver images such as silver ferrocyanide, silver-copper chloride, silver-chromium chloride, as well as silver chromate, and other water insoluble silver salts. They are also useful with bichromated gelatin.

Some of the products are useful in the manufacture of azo dyes for the coloring of textiles, molded articles, rubber dyes, paints pigments, et cetera. They may be incorporated in cellulosic spinning solutions as described in Kirby application Ser. No. 411,261 and Woodward Ser. No. 411,262, filed September 17, 1941, and converted by treatment with a diazonium solution to an azo dye.

This application is indirectly related to Kirby and Woodward application, Serial No. 395,496, filed May 27, 1941. That application relates to hydroxyl substituted naphthylamines or substituted aminonaphthols having a hydroxyl group directly attached to one benzene ring of the naphthalene nucleus, the other benzene ring having directly attached thereto an amino group which is linked through an unsubstituted methylene group to a bivalent hydrocarbon radical or ether-interrupted hydrocarbon radical which radical is in turn linked to the amino nitrogen of an amide having at least six carbon atoms.

As many apparently widely different embodiments of this invention may be made without departing from the spirit and scope thereof, it is to be understood that the invention is not limited to the specific embodiments thereof except as defined in the appended claims.

We claim:

1. A color yielding element for recording photographic images comprising a base having imposed thereon a colloid layer containing a basic N-substituted amino naphthalene dye intermediate containing as the sole coupling-directive group the said substituted amino group wherein the amino nitrogen atom thereof is connected through an acyclic methylene group by means of a bivalent radical of at least two carbon atoms taken from the class consisting of hydrocarbon radicals and ether interrupted hydrocarbon radicals to the nitrogen atom of an acid amide.

2. A photographic color-yielding element comprising a base having imposed thereon a water permeable colloid layer containing a dye intermediate of the formula:

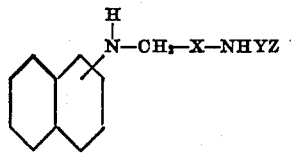

wherein X is a divalent radical taken from the group consisting of divalent hydrocarbon radicals and ether-interrupted hydrocarbon radicals of at least two carbon atoms, Y is a member of the group consisting of —CO— and —SO$_2$, and YZ is the acid hydroxyl-free portion of an organic acid taken from the group consisting of organic carboxylic and sulfonic acids and the —NH— group directly attached to the naphthalene nucleus is the sole coupling-directive group.

3. An element as set forth in claim 2 wherein said intermediate contains in at least one of the radicals taken from the group consisting of Z and the naphthalene radical a solubilizing group taken from the group consisting of carboxylic and sulfonic acid groups.

4. An element as set forth in claim 2 wherein said intermediate contains in at least one of the radicals taken from the group consisting of Z and the naphthalene radical a solubilizing group taken from the group consisting of carboxylic and sulfonic acid groups and X is a divalent hydrocarbon radical.

5. An element as set forth in claim 2 wherein said dye intermediate has a molecular weight of at least 300.

6. A photographic color yielding element as set forth in claim 2 wherein the amino group is in the alpha-position.

7. A photographic element comprising a base having imposed thereon at least one photo-sensitive stratum and a stratum comprising at least one basic dye intermediate of the formula:

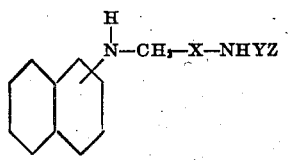

wherein X is a divalent radical taken from the group consisting of divalent hydrocarbon radicals and ether-interrupted hydrocarbon radicals of at least two carbon atoms, Y is a member of the group consisting of —CO— and —SO$_2$ and YZ is the acid hydroxyl-free portion of an organic acid taken from the group consisting of organic carboxylic and sulfonic acids and the —NH— group directly attached to the naphthalene nucleus is the sole coupling-directive group.

8. A photographic element comprising a base having imposed thereon at least one photo-sensitive silver halide stratum and a stratum comprising at least one basic dye intermediate of the formula

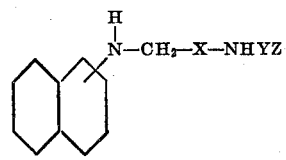

wherein X is a divalent radical taken from the group consisting of divalent hydrocarbon radicals and ether-interrupted hydrocarbon radicals of at least two carbon atoms, Y is a member of the group consisting of —CO— and —SO$_2$ and YZ is the acid hydroxyl-free portion of an organic acid taken from the group consisting of organic carboxylic and sulfonic acids and the —NH— group directly attached to the naphthalene nucleus is the sole coupling-directive group.

9. A photographic element comprising a base having imposed thereon at least one photosensitive stratum and a stratum comprising at least one basic dye intermediate of the formula:

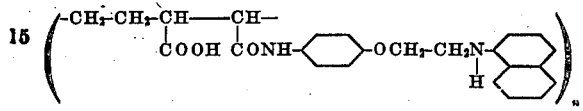

wherein $n$ is a positive integer greater than one.

10. A photographic element comprising a base having imposed thereon at least one water-permeable colloid layer containing light-sensitive silver halides and a basic dye intermediate of the formula:

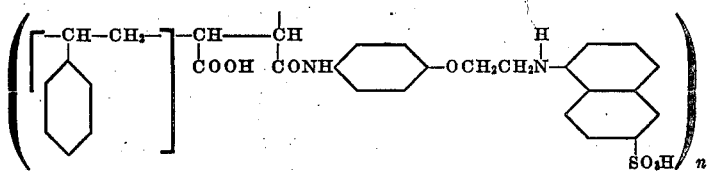

wherein $n$ is a positive integer greater than 1.

11. A photographic element comprising a base having imposed thereon at least one water-permeable colloid layer containing light-sensitive silver halides and a basic dye intermediate of the formula:

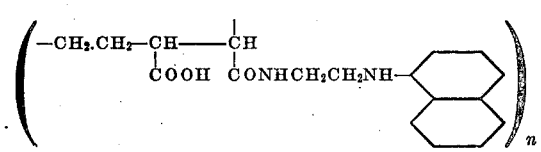

wherein $n$ is a positive integer greater than 1.

JAMES EMORY KIRBY.
DAVID W. WOODWARD.

Certificate of Correction

Patent No. 2,389,575. November 20, 1945.

JAMES EMORY KIRBY ET AL.

It is hereby certified that errors appear in the printed specification of the above numbered patent requiring correction as follows: Page 1, first column, line 15, for "dyes coupling" read *dyes upon coupling*; and second column, lines 27–28, for "substtiuted" read *substituted*; page 4, first column, line 45, for "soduim" read *sodium*; page 5, second column, lines 5 to 8, inclusive, for that portion of the formula reading

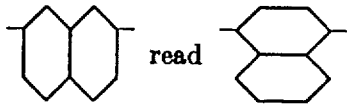

and that the said Letters Patent should be read with these corrections therein that the same may conform to the record of the case in the Patent Office.

Signed and sealed this 26th day of February, A. D. 1946.

[SEAL]

LESLIE FRAZER,
*First Assistant Commissioner of Patents.*